Patented Apr. 25, 1933

1,905,990

UNITED STATES PATENT OFFICE

JOHN A. AESCHLIMANN, OF BASEL, SWITZERLAND, ASSIGNOR TO HOFFMANN-LA ROCHE INC., OF NUTLEY, NEW JERSEY, A CORPORATION OF NEW JERSEY

DISUBSTITUTED CARBAMIC ACID ESTERS OF PHENOLS CONTAINING A BASIC CONSTITUENT

No Drawing. Application filed April 8, 1931, Serial No. 528,708, and in Germany January 2, 1931.

According to Stedman (Biochemical Journal, vol. 20, 1926, page 720) the myotic action of physostigmine (eserine) is connected with the presence of the methylcarbamic acid ester group. He prepared a great many monoalkyl- and monoarylcarbamic acid esters of basically substituted phenols, which had a myotic action on the cat's eye (Biochemical Journal vol. 20, 1926, page 719, volt. 23, 1929, page 17; Journal of the Chemical Society of London, vol. 135, 1929, page 609). Physostigmine is decomposed on being heated in vacuum; from the methylcarbamic acid ester group a phenol group is formed and eseroline is obtained (Strauss, Annalen der Chemie, vol. 401, 1913, page 352, 2nd paragraph). The monoalkyl- and monoarylcarbamic acid esters described by Stedman are also very easily decomposed. Decomposition is particularly marked on heating the aqueous solutions of their quaternary salts, whereby methyl isocyanate is split off (Biochemical Journal, vol. 20, 1926, page 733, line 15).

The present invention relates to disubstituted carbamic acid esters of phenols containing a basic substituent, which also have a very decided physostigmine-like action. The dissubstituted carbamic acid esters of the basically substituted phenols may be distilled in vacuum without decomposition. Their aqueous solutions do not split off any isocyanate on heating and do not lose their activity.

The disubstituted carbamic acid esters of the basically substituted phenols may for instance be obtained by allowing the dialkyl-, arylalkyl- or diarylcarbamic acid halogenides to react with the alkali salts of the basically substituted phenols according to the following equation:

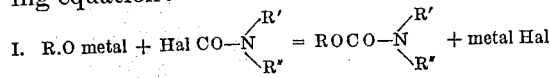

or by treating the carbonic acid esters of basically substituted phenols with secondary amines according to the following equation:

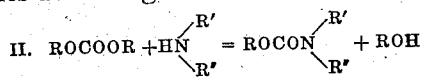

In these equations R represents a basically substituted phenol radical, R' and R" and alkyl- or aryl group.

As the new compounds as such are almost insoluble in water, it is more convenient to use their salts or their quaternary ammonium compounds.

Example 1

To a solution of 13.7 parts of m-dimethylaminophenol and 5.6 parts of potassium hydroxide in 100 parts of alcohol 16.9 parts of methylphenylcarbamic acid chloride are added. After a short period of boiling the mixture, which at first showed an alkaline reaction, has become almost neutral. The precipitated potassium chloride is separated by warm filtration and the alcohol distilled off. The ether solution of the residue is washed with a solution of sodium hydroxide in order to remove the unchanged dimethylaminophenol and the ether is then evaporated. Hereafter the residue is distilled in vacuum. Boiling point 245°/18 mm. The distillate, a viscous liquid, soon becomes crystalline and by repeated recrystallization from alcohol is rendered pure white; it melts at 84° C.

The dimethylsulfate addition product, prepared in the cold in acetone solution, melts after recrystallization from alcohol at 163° C. and is easily soluble in water.

The diphenylcarbamic acid ester of m-dimethylaminophenol, obtained in the same manner, melts at 110° C.; it is insoluble in water, soluble in hot alcohol and in an excess of mineral acids.

Example 2

2.16 parts of lamellated sodium are mixed with 100 parts of benzene and a solution of 16.9 parts of o-hydroxybenzyldiethylamine in 20 parts of benzene is added. With evolution of hydrogen the sodium salt is quickly formed. 10 parts of dimethylcarbamic acid chloride are added through the reflux condenser and the product is boiled on the steambath. After cooling it is washed with water and a solution of sodium hydroxide and the residue from the benzene is distilled in vacuum. 20 parts of the dimethylcarbamic acid ester of o-hydroxybenzyldiethylamine are obtained as a mobile oil. The methiodide melts at 157° C.

*Example 3*

A solution of 8-hydroxyquinoline in the equivalent quantity of a triple normal solution of potassium hydroxide is evaporated to dryness in vacuum and the residue heated with the equimolecular quantity of dimethylcarbamic acid chloride in benzene on the steambath. The benzene solution is then washed with water and a solution of sodium hydroxide, and distilled in vacuum. The product melts after recrystallization from ether at 80° C. and forms a hydrochloride melting at 195° C.

From m-dimethylaminophenol the dimethylcarbamic ester may be prepared in a similar manner and boils at 190° C. at the water-pump. Its dimethylsulfate addition-product melts at 143°.

*Example 4*

12 parts of tetramethyl-3, 3'-diaminophenylcarbonic acid ester are mixed with 3.7 parts of piperidine and after 14 hours' standing heated to 90° C. for an hour.

The following reaction occurs:

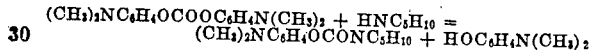
(CH₃)₂NC₆H₄OCOOC₆H₄N(CH₃)₂ + HNC₅H₁₀ =
(CH₃)₂NC₆H₄OCONC₅H₁₀ + HOC₆H₄N(CH₃)₂

The mixture is then dissolved in ether and the m-dimethylaminophenol removed by shaking with a solution of sodium hydroxide. After drying the ether solution is evaporated. The residue crystallizes from ether after the addition of petroleum ether in heavy crystals melting at 56° C. The quaternary methylsulfate is obtained in acetone solution on addition of the theoretical quantity of dimethylsulfate; it melts at 123° C.

I claim:

1. The disubstituted carbamic acid esters of phenols containing a tertiary amino group, of the general formula,

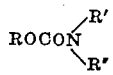

R representing a phenyl radical with a tertiary amino group selected from the group which consists of a phenyl radical with a dialkyl amino group, a phenyl radical with a dialkyl amino alkyl group and a benzo-heterocyclic radical; in which general formula the radicals R' and R'' may be alkyl radicals, or aryl radicals of the benzene series, or the group

may constitute part of a piperidine nucleus; which products can be distilled in vacuo without decomposition, and form stable crystalline quaternary compounds or salts easily soluble in water forming neutral solutions, stable to heat, and having a physostigmine like action.

2. The methylphenylcarbamic acid ester of m-dimethylaminophenol, which forms crystals melting at 84° C. and can be distilled in vacuum without decomposition and forms a quaternary methylsulfate melting at 163° C., easily soluble in water, forming solutions stable to heating, and having a physostigmine-like action.

In witness whereof I have hereunto set my hand.

JOHN A. AESCHLIMANN.